J. C. MacLACHLAN.
PROCESS OF PRODUCING POWDERED MEAT.
APPLICATION FILED MAY 26, 1919.

1,372,527.

Patented Mar. 22, 1921.
2 SHEETS—SHEET 1.

INVENTOR.
JOHN C. MacLACHLAN.
BY HIS ATTORNEYS.

J. C. MacLACHLAN.
PROCESS OF PRODUCING POWDERED MEAT.
APPLICATION FILED MAY 26, 1919.

1,372,527.

Patented Mar. 22, 1921.

INVENTOR
JOHN C. MACLACHLAN.
BY HIS ATTORNEYS.

UNITED STATES PATENT OFFICE.

JOHN C. MacLACHLAN, OF ST. PAUL, MINNESOTA, ASSIGNOR TO STANDARD FOOD PRODUCTS COMPANY, OF ST. PAUL, MINNESOTA, A CORPORATION OF DELAWARE.

PROCESS OF PRODUCING POWDERED MEAT.

1,372,527.   Specification of Letters Patent.   Patented Mar. 22, 1921.

Application filed May 26, 1919. Serial No. 299,903.

*To all whom it may concern:*

Be it known that I, JOHN C. MACLACHLAN, a citizen of the United States, residing at St. Paul, in the county of Ramsey and State of Minnesota, have invented certain new and useful Improvements in Processes of Producing Powdered Meat; and I do hereby declare the following to be a full, clear, and exact description of the invention, such as will enable others skilled in the art to which it appertains to make and use the same.

My present invention provides an improved dry powdered meat product containing all of the nutritive elements of the original meat, to wit: all of the organic and inorganic substances with all but a small per cent. of the water removed. The meat fiber is disintegrated but contained in the powder in pulverized form, and, moreover, this powdered meat is a homogeneous substance containing no lumps or moist particles.

In accordance with the improved process, the lean meat, preferably in moist condition, is first ground or cut, advisedly, to the condition customary for making sausage, and, thereafter, is violently beaten into a spray of fine particles in the presence of a hot drying medium, such as hot air. By this latter operation, the meat particles are not only disintegrated and reduced to very fine form, such as necessary to produce a powder, but these fine particles are independently air dried in the hot air or drying medium, so that when they fall to the bottom of the hot air container or housing, the product will be a finely divided or powdered dry meat.

For reducing the ground meat to the dry powdered form, as above stated, I preferably employ an apparatus disclosed and claimed in my pending application S. N. 287,233, filed of date, April 3, 1919, and entitled "Apparatus for producing powdered meat products, and the like."

The preferred apparatus above referred to is illustrated in the accompanying drawings wherein like characters indicate like parts throughout the several views.

Referring to the drawings.

The numeral 4 indicates a fragment of the upper portion of a housing through which hot air is circulated, preferably substantially as more fully illustrated in my said prior application.

Figure 1:
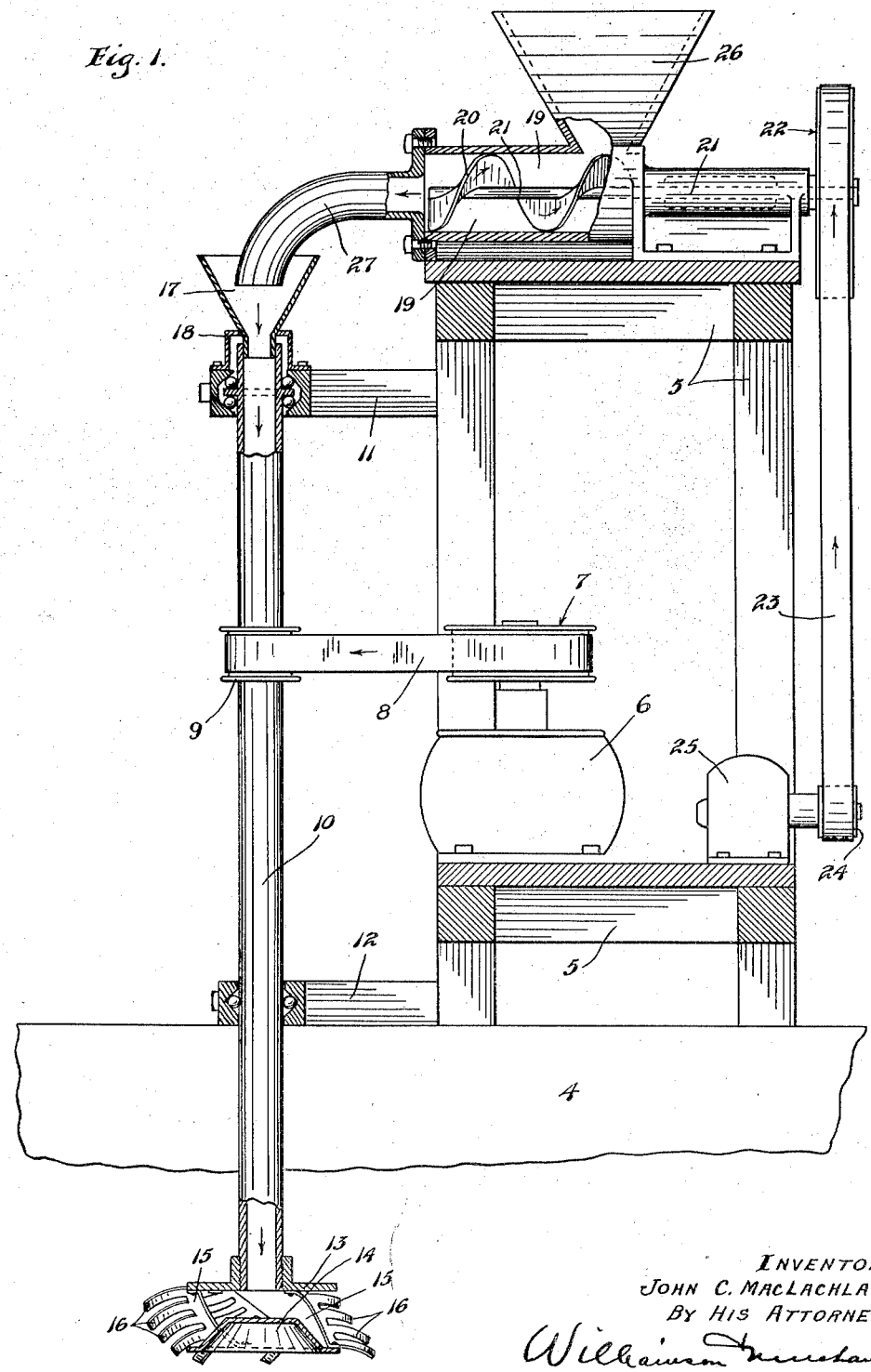
Figure 1 is a vertical section illustrating the said apparatus.
Figure 3:
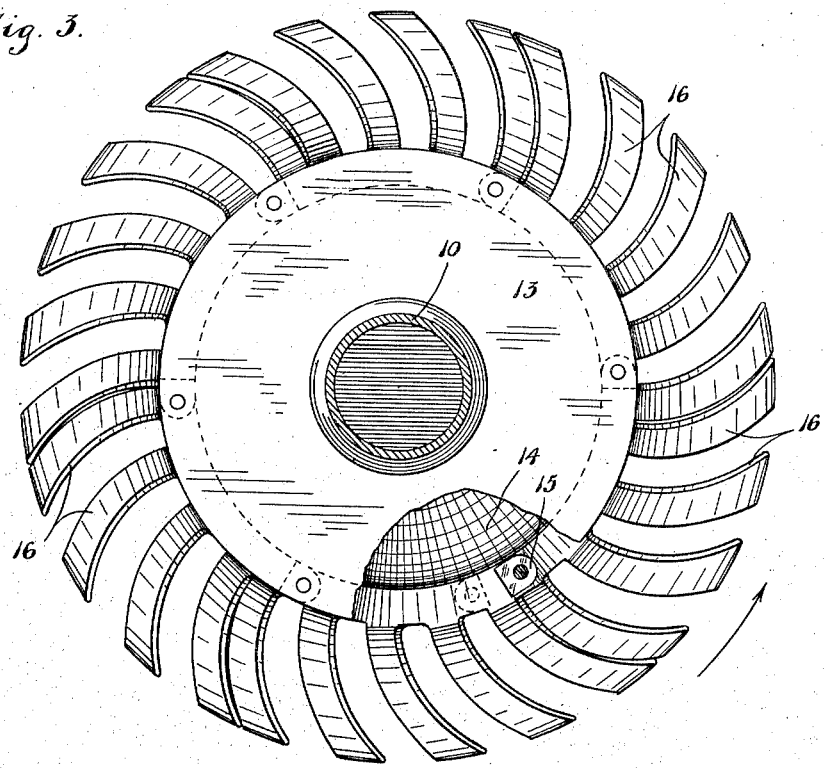
Fig. 3 is a section on the line 3—3 of Fig. 2.
Figure 2:
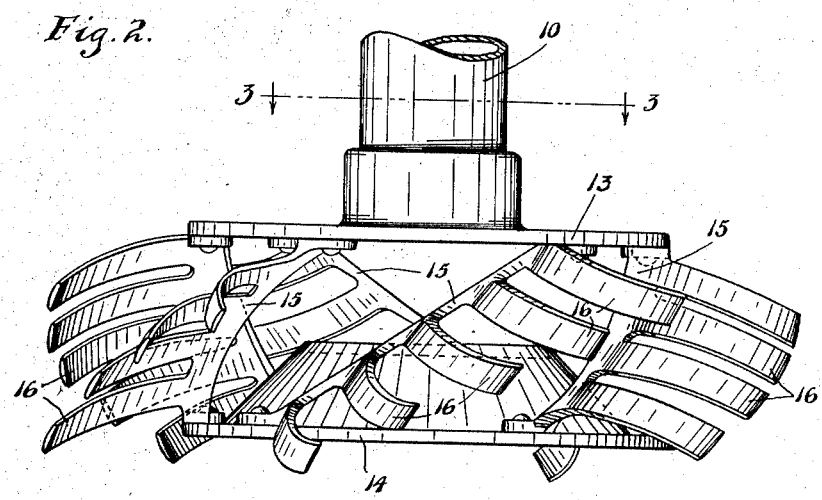
Fig. 2 is a side elevation of the combined discharge head or beater.

The numeral 5 indicates a framework mounted above the housing 4 and on which is mounted a motor, such as an electric motor 6, the armature shaft of which is vertically extended and equipped with a driving pulley 7. A belt 8 runs over the pulley 7 and over a smaller pulley 9 on the tubular shaft 10 that is journaled in suitable bearings on projections 11 and 12 from one side of the framework 5. To the lower end of the tubular shaft 10 and within the housing 4 is secured the improved discharge head. This discharge head, as preferably constructed, comprises an annular upper plate 13, an upwardly bulged concavo-convex lower plate 14 and a plurality of circumferentially spaced oblique bars 15 provided with curved beating prongs or fingers 16. The hub of the plate 13 is rigidly secured to the lower end of tubular shaft 10 and the ends of the bars 15 are rigidly secured to said plate 13 and to the rim of the bottom plate 14. The beating prongs 16 are vertically spaced on the bars 15 and are forwardly curved in respect to the direction of rotation of the discharge head, such direction being indicated on Fig. 3 by a large arrow. The plates 13 and 14 are thus rigidly connected but held with considerable space between them and with the approximately flat top portion of the bottom plate 14 immediately under the open lower end of the tubular shaft 10.

In the arrangement shown, a funnel 17 is telescoped into the upper end of the tubular shaft 10 and held in position by a socket 18 on the upper arm 11. Secured on top of the frame 5 is a horizontally disposed cylinder 19 in which works a feed screw 20, the shaft 21 of which extends through a bearing at the rear end of said cylinder and is provided with a large pulley 22.

A belt 23 runs over the pulley 22 and over a smaller pulley 24 of a small slow running electric motor 25 mounted on the frame 5. The cylindrical casing 19 has a hopper 26 that opens into one end thereof, and at its discharge end, said casing has a downwardly curved discharge tube 27 that opens into the funnel 17. In operation, the tubular shaft 10 and the discharge head will be driven at very high speed, usually about 5000 revolutions per minute, while the feed screw 20 will be slowly rotated. The meat that is to be desiccated and powdered will first be finely chopped or cut up, as by running the same through an ordinary sausage machine, and when placed in the hopper 26 will be fed to the casing 19, and by the feed screw, will be discharged into the funnel through the tube 27, and from thence, will fall through the funnel and the tubular shaft 10 to the discharge head. The meat that drops onto the raised bottom of the lower plate 14 of the discharge head will be thrown violently outward under the action of centrifugal force and in its outward movement it will be engaged by the prongs 16. These prongs running at such terrifically high speed will engage the meat particles over and over again before the meat can be freed from the action thereof, and this takes place in the drying medium, the meat substance will be reduced to a finely divided or powdered form and will be in dry condition by the time it reaches the bottom of the housing. It should be noted that the beating prongs are not only curved but that they are set on a bevel. The curved form prevents too rapid outward throwing of the meat particles and insures a repetition of the beating action, while the inclination of the prongs produces a downward general deflection, so that the meat particles will be engaged repeatedly by the prongs of the same bar as well as by the prongs of adjacent bars. The exact manner in which these beating prongs act on the meat particles cannot be stated with absolute certainty, but the above statement is thought to be substantially correct. At any rate, there is no question as to the results obtained, as has been demonstrated repeatedly in practice. The meat particles need not be cut finer than for ordinary sausage, but should be in moist condition when subjected to the action of the beating head. The beating head absolutely tears up all of the fiber of the meat particles and the powder produced by me, in practice, has been so fine that it is almost impalpable. Nevertheless, this desiccated powdered meat product contains all of the food elements of the original meat, towit: all of the organic and inorganic substances with the greater part of the water taken out.

While the apparatus above illustrated is preferably employed, it will, of course, be understood that the improved product may be produced by any suitable apparatus or means for carrying out the necessary steps of the process.

In the use of the apparatus above illustrated, the grinding of the meat to a sausage condition can be easily carried out on any of the commercial sausage grinders, but may be performed by hand operated knives.

Analysis of the meat powder which I have made, shows the same to be as follows:—

| | |
|---|---|
| Moisture | 4—53 |
| Ash | 6—67 |
| Proteid | 75—68 |
| Fat | 8—65—90 |
| Nitrogen free matter | 4—46 |
| Crude fiber | 0—00—10 |
| | 100—00—00 |

The above product may be made from lean beef and contains only a negligible amount of fat, but, as is obvious from the analysis, contains all of the food elements including the disintegrated fiber of the meat.

By the beating action in the presence of hot air, the meat substance is beaten to complete disintegration, so that by the time it falls to the bottom of the hot air chamber, it will be in dry powdered form. The fine meat particles thus beaten and thrown into the form of a fine shower will, of course, fall to the bottom of the hot air chamber and in thus falling, all of the powder-forming particles of the meat will be independently air dried, so that there will be no tendency for the same to cohere or form a pasty or sticky mass. This powdered substance is not cooked, nor is it dried in bulk, but is dried while in atomized condition, each particle being independently dried so that when the powder is collected at the bottom of the receptacle, it will have no tendency to form a pasty mass. This powdered meat product is readily soluble in water. While the fiber particles will not actually be dissolved, they are so fine in character that they will give off all of the juices and extracts and themselves will be readily carried in the water and form an emulsion therewith under the slightest agitation.

A powdered meat product of this character is believed to be novel and an important advance step, in the art of producing desiccated foods. Because of its nutritive character, the product is very valuable for use of invalids, but nevertheless, has a much wider range of utility. It can be made at a cost slightly greater than the cost of the original meat. Considered in point of food value, it is well adapted for Army use and for home use for the making of beef teas, gravies, soups, and the like. In air-tight containers, it will keep for almost indefinite time and even when exposed to the air, it will keep in good condition for months.

Tests by chemical experts indicate that one pound of this powdered meat has a food value equal to ten or twelve pounds of fresh meat.

What I claim is:

1. The process of producing dry powdered meat, which consists in reducing the original meat to finely cut or ground condition, and in thereafter beating the same into a fine spray in the presence of a hot drying medium.

2. The process of producing dry powdered meat which consists in reducing the original meat to finely cut or ground condition, in projecting the same outward by the action of centrifugal force and intercepting and beating the same in the presence of a hot drying medium, and in independently drying the powdered meat particles while suspended in said hot drying medium.

In testimony whereof I affix my signature in presence of two witnesses.

JOHN C. MacLACHLAN.

Witnesses:
CLARA DEMAREST,
F. D. MERCHANT.